May 8, 1928. 1,668,855
A. C. LUDLUM
SUCTION ELEVATOR
Filed July 19, 1922
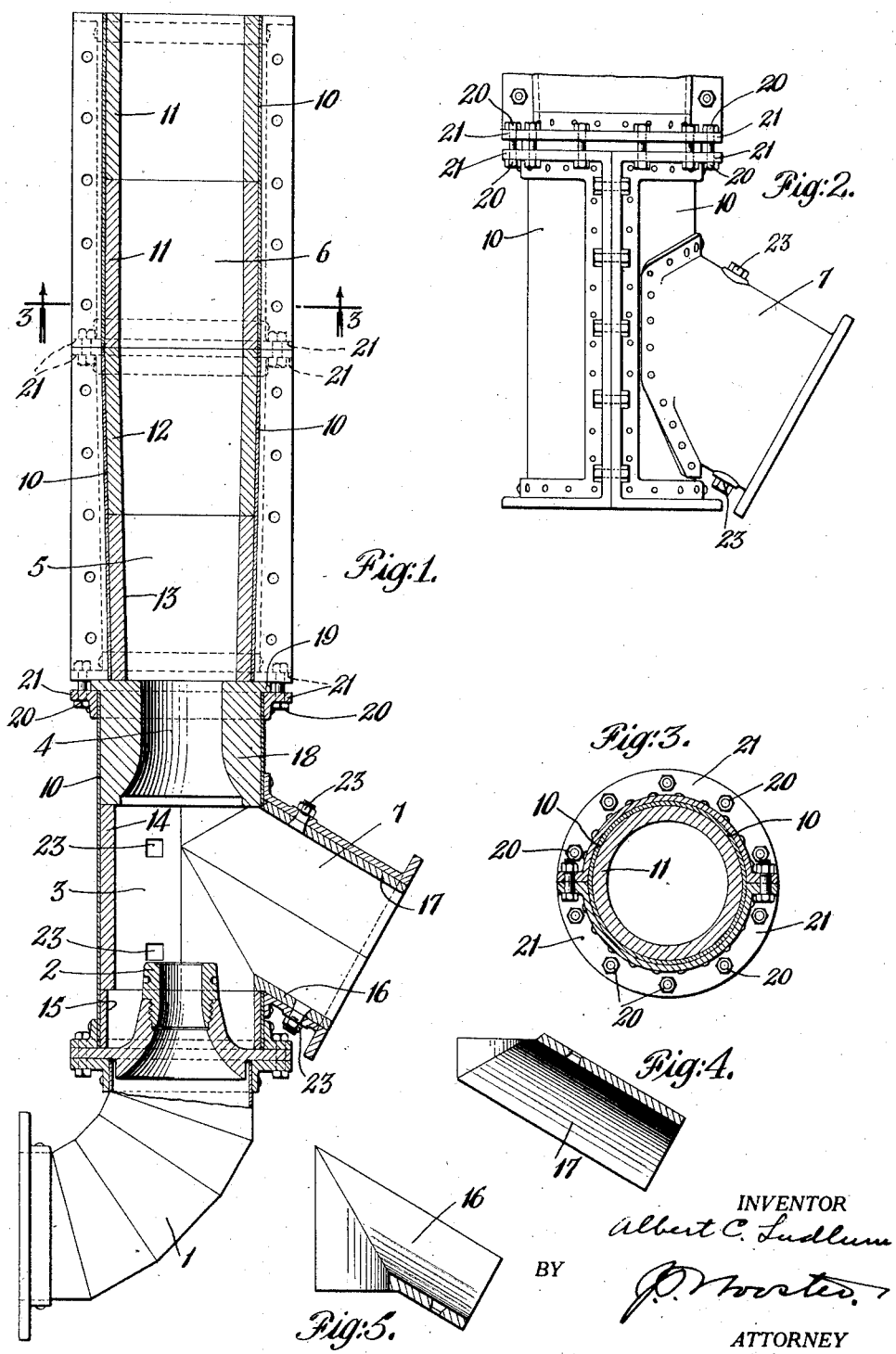
INVENTOR
Albert C. Ludlum
BY
ATTORNEY Patented May 8, 1928.

1,668,855

UNITED STATES PATENT OFFICE.

ALBERT C. LUDLUM, OF NEW YORK, N. Y., ASSIGNOR TO NEW YORK ENGINEERING COMPANY, A CORPORATION OF NEW YORK.

SUCTION ELEVATOR.

Application filed July 19, 1922. Serial No. 576,038.

This invention relates to suction elevators and has for its object to provide an improved construction whereby adjustments and replacements can be made without dismantling the entire structure.

As is well known, suction elevators of this type are subjected to heavy wear and abrasion at and adjacent the nozzle, due to the high velocity of the gravel being discharged. It is common practice at present to provide the nozzle and linings of wear resisting alloy steels, such as manganese steel or chrome manganese steel, but the previous practice has not permitted adjustment of parts to distribute the wear or easy renewal of a worn part. It is found in practice that the wear is concentrated at certain points in and adjacent the nozzle depending upon the character of work done and the velocity of the water. Replacement can frequently be avoided if a part worn in one place can be turned around to remove such place from the region of destructive wear to be replaced by a heavier portion. It is also found in practice that the manganese steel nozzle ring and the manganese steel liners become peened out or expanded due to the hammering action of the gravel. After these parts are peened out or expanded, they become wedged in the housing so tightly that it is almost impossible to get them out. Accordingly, it is of great advantage to have the housing or frame of the elevator split longitudinally, and the lining parts split into more or less corresponding sections, so that adjustments and replacements of the manganese parts can readily be made.

By this invention an elevator is provided having removable linings and an adjustable nozzle, the linings being sectioned so as to be in relatively small pieces and relatively inexpensive, as well as more conveniently transported to inaccessible sections where these devices are frequently used.

In the accompanying drawings,

Figure 1 is a vertical section of a portion of an elevator embodying the invention;

Fig. 2 is an elevation of the nozzle section;

Fig. 3 is a section on the line 3—3 of Fig. 1; and

Figs. 4 and 5 are views partly in section of the elbow lining sections.

1 represents the water supply from a pump or other source of pressure discharging through nozzle 2 into the mixing chamber 3 which in turn leads through main nozzle 4 to the expanding uptake 5 which in turn is connected to the ordinary cylindrical uptake 6. The gravel is drawn in by a pipe not shown connected to suction pipe 7, formed as an elbow leading into the mixing chamber 3.

Each of the sections 3, 5 and 6 comprises flanged semi-circular pipe sections 10 bolted together and containing wearing rings or liners 11, 12, 13, 14, 15, 16, 17 and a nozzle ring 18 having a flange 19. The nozzle ring 18 is held between liners 13 and 14 by the bolts 20 passing through flanges 21, the sections 10 being likewise flanged at 21 and bolted together.

The principal part of the wear on the nozzle ring 18 comes opposite the gravel inlet 7, so the nozzle ring 18 can be turned from time to time by loosening the bolts 20 and engaging the flange 19. Wedges or other means are used to slightly separate the flanges 21 so as to relieve the flange 19 of the weight of the sections above.

The rings 11, 12, 13 can also be turned to distribute the wear in a similar manner while the semi-circular lining section 14 can be reversed, since practically no wear occurs at the bottom but there is some wear at the top immediately under the nozzle ring 18. The lining sections 16, 17 wear to some extent but can conveniently be adjusted and so will be replaced when sufficiently worn. However, by reason of being divided in the manner shown, renewal is easy, as by taking off the half section of 10 carrying the elbow 7 as seen in Fig. 2, the liners 14, 16, 17 are bolted to their respective casing by bolts 23 to resist turning. Turning of nozzle 18 is prevented by its flange 19 being clamped between flanges 21.

The foregoing construction furnishes decided advantages in apparatus of this type by reason of the facility with which inspection, adjustment and replacement can be had, and only brief shut-downs will be required for inspection, adjustment or replacement of parts, and the replaced parts will be relatively inexpensive.

What I claim is:

1. In a suction elevator, the combination with a mixing chamber having removable lining throughout, of connections for pressure water supply and material to be lifted, the axes of said connections being arranged at an angle, a substantial portion of the lining of said chamber being split along a plane through the axis of the water supply connection, and a casing longitudinally split along substantially the same plane as the lining.

2. In a suction elevator, the combination with a mixing chamber having a lining throughout and connections for pressure water supply and material to be lifted, with the axes of said connections arranged at an angle, the lining of said chamber being removable and split longitudinally of at least one of said connections, of a longitudinally split casing around the mixing chamber, and both the lining and casing being split along planes through the axis of the chamber.

3. In a suction elevator, a lifting pipe, a pressure water supply pipe discharging longitudinally of the lifting pipe into a mixing chamber, a mixing chamber section comprising longitudinally flanged sections bolted together and enclosing a nozzle, a gravel pipe attached to one of said flanged sections to lead into the mixing chamber, a rotatably adjustable nozzle ring discharging from the mixing chamber, said lifting pipe being above the nozzle and fastened to hold the nozzle against turning, and removable liners above and below said nozzle in the gravel pipe, the chamber, and the lifting pipe, the lower liners co-operating to line the mixing chamber and gravel pipe, and being accessible by separating the mixing chamber sections.

Signed at New York, in the county of New York and State of New York, A. D., 1922.

ALBERT C. LUDLUM.